(12) United States Patent
Dharia et al.

(10) Patent No.: US 10,666,077 B1
(45) Date of Patent: May 26, 2020

(54) REMOTE CONFIGURATION OF BATTERY CHARGING SETTINGS

(71) Applicant: Amazon Technologies, Inc., Seattle, WA (US)

(72) Inventors: Bhupal Kanaiyalal Dharia, Santa Clara, CA (US); Feng Wang, Beijing (CN); Jianlin Chen, Beijing (CN); Xuezhang Dong, San Jose, CA (US)

(73) Assignee: Amazon Technologies, Inc., Seattle, WA (US)

( * ) Notice: Subject to any disclaimer, the term of this patent is extended or adjusted under 35 U.S.C. 154(b) by 226 days.

(21) Appl. No.: 15/800,741

(22) Filed: Nov. 1, 2017

(51) Int. Cl.
*H02J 7/00* (2006.01)
*G06F 1/28* (2006.01)

(52) U.S. Cl.
CPC ............... *H02J 7/007* (2013.01); *G06F 1/28* (2013.01)

(58) Field of Classification Search
None
See application file for complete search history.

(56) References Cited

U.S. PATENT DOCUMENTS

2016/0197506 A1* 7/2016 Abiru ............... H01M 10/48
320/134

* cited by examiner

*Primary Examiner* — Robert Grant
(74) *Attorney, Agent, or Firm* — Eversheds Sutherland (US) LLP

(57) ABSTRACT

Systems, methods, and computer-readable media are disclosed for remote configuration of battery charging settings. In one embodiment, an example device may include a battery, at least one memory that stores computer-executable instructions, and at least one processor. The at least one processor may be configured to access the at least one memory and execute the computer-executable instructions to determine that a charger is connected to the device, determine a first length of time that a maximum charging voltage for the battery has been set to a first voltage value, determine that the maximum charging voltage is to be reduced from the first voltage value to a second voltage value, and charge the battery at a maximum of the second voltage value.

19 Claims, 6 Drawing Sheets

REMOTE CONFIGURATION OF BATTERY CHARGING SETTINGS

BACKGROUND

Electronic devices may include batteries or other portable power sources. Certain batteries may be subject to swelling, expanding, or otherwise changing form over time. For example, batteries may swell or otherwise react to thermal events, age, corrosion, damage to components of the batteries, and other factors. Damaged batteries, or batteries that have been used a number of times, may still be charged at charging voltages that do not mitigate any potential adverse effects or further damage to the batteries. In addition, in some instances, battery charging policies may need to be modified without having to implement modifications at individual devices. Accordingly, remote configuration of certain battery settings may be desired.

Figure 1:
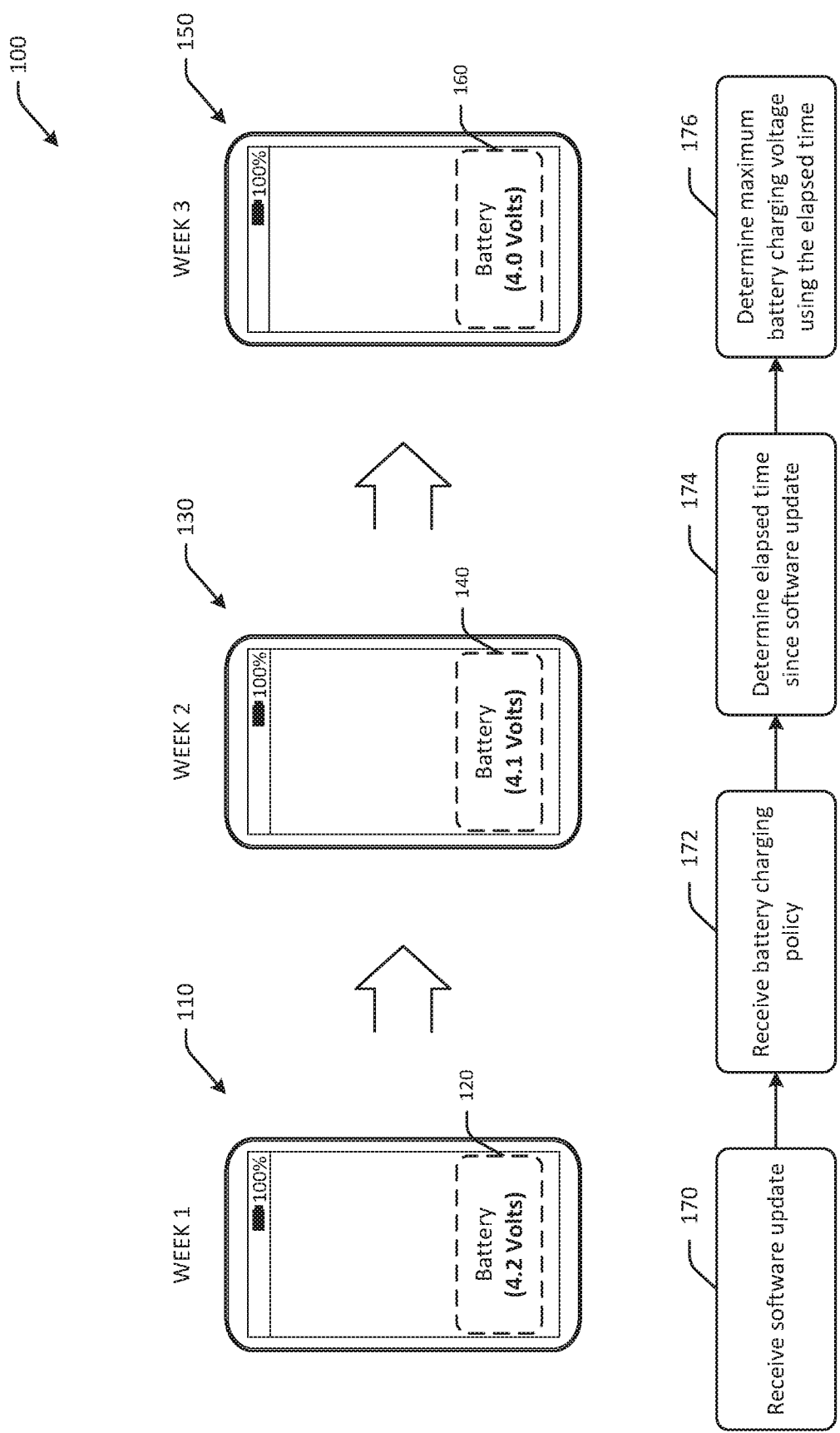
FIG. 1 is an example use case and schematic drawing of remote configuration of battery charging settings over time in accordance with one or more embodiments of the disclosure.

The detailed description is set forth with reference to the accompanying drawings. The drawings are provided for purposes of illustration only and merely depict example embodiments of the disclosure. The drawings are provided to facilitate understanding of the disclosure and shall not be deemed to limit the breadth, scope, or applicability of the disclosure. The use of the same reference numerals indicates similar, but not necessarily the same or identical components. Different reference numerals may be used to identify similar components. Various embodiments may utilize elements or components other than those illustrated in the drawings, and some elements and/or components may not be present in various embodiments. The use of singular terminology to describe a component or element may, depending on the context, encompass a plural number of such components or elements and vice versa.

DETAILED DESCRIPTION

Overview

Electronic devices may be used to consume content. Some electronic devices may be portable and may include portable power sources, such as batteries and the like. The batteries or power sources may be rechargeable. Batteries used in electronic devices may have various capacities and/or charging voltages. For example, some batteries may have charging voltages (also referred to as maximum charging voltages) of 4.2 volts, while other batteries may have charging voltages of 9 volts, 3.90 volts, 1.5 volts, and other voltages. Over time, some batteries may deteriorate with respect to capacity. For example, a relatively new battery may have a charging voltage of 4.1 volts, while the same battery after a number of charge cycles (e.g., a charge cycle may be use of a battery's complete capacity, but not necessarily from a full charge to a full discharge, etc.) may retain a charging voltage of 4.1 volts, but may have a lower capacity. The useful life of batteries (e.g., the ability to power an electronic device, etc.) may therefore reduce over time. An example of a charge cycle may be using 40% of a battery's capacity, charging the battery to 100%, and then using 60% of the battery capacity. Although the battery may have been charged in between active usage, only one charge cycle may have been completed. Active usage, or usage, of a battery may include usage of the battery to power device non-essential functionality, such as powering a device display, wireless radios, etc., as opposed to essential functionality, such as internal clocks and other components of a device.

Certain charging voltages may cause thermal events, such as overheating, shocks, hot spots, and the like, or physical damage to batteries. For example, if a battery has a charging voltage of 4.2 volts, and the battery has some corrosion, or there is a power surge, the battery may be damaged. In some instances, damaged batteries may begin to swell or otherwise deform, which may damage a device that the battery is used to power. For example, if a smartphone battery swells, a display of the smartphone may be damaged or cracked, depending on the degree of swelling.

This disclosure relates to, among other things, systems, methods, computer-readable media, techniques, and methodologies for remote configuration and/or management of battery charging settings, such as battery charging voltages and/or battery charging policies. Management and/or configuration of battery charging policies may mitigate potential damage to batteries and the devices that use the batteries. For example, if a maximum battery charging voltage for a particular battery or a particular type or model of battery is to be reduced, so as to reduce risk of swelling or other damage, the maximum battery charging voltage may be modified in one or more policies or system properties at the device.

In some instances, batteries of a particular type may be used in more than one device and/or by multiple users. In such instances, management and/or configuration of battery charging policies may be implemented at the multiple devices. To increase efficiency of changes to multiple batteries at or near the same time, certain embodiments may configure battery charging policies for certain batteries remotely, such as via one or more servers.

Embodiments of the disclosure include methods and systems that mitigate potential damage to batteries by remotely managing and/or configuring charging policies and/or capacity of batteries. For example, certain embodiments may modify charging policies for batteries based at least in part on a time-based interval, an age of a battery, usage of a battery, a number of charge cycles completed by the battery, and/or a combination of these factors and/or other factors. In some instances, remote management and/or configuration of batteries may occur after an over-the-air software update that provides management of charging policies for batteries used at a particular device. Over-the-air software updates may be used to provide battery charging policy management or configuration at devices that previously may not have included such functionality. Certain embodiments may reduce swelling and other damage, and may reduce occurrence of thermal events, of batteries.

Referring to FIG. 1, an example environment 100 with a mobile device with remote configuration of battery charging settings over time is illustrated in accordance with one or more embodiments of the disclosure. The mobile device may be any suitable portable device, such as a smartphone, an e-reader, a tablet, an audio or video streaming device, an Internet of Things (IoT) device, a product ordering button or device, a home sensor, an aging in place device, an earphone, a speaker device, or another device. In the example of FIG. 1, the device may be a smartphone with a battery 120. The battery 120 may be a rechargeable battery, and may be any suitable type of battery, such as lithium-ion and the like. The battery 120 may power the device.

At a first instance in time 110, such as a first week (e.g., Week 1) after a timestamp, the battery 120 may have a capacity or charging voltage of 4.2 volts. The timestamp may be, for example, a time at which a software update was received by or initiated at the device, a time when an update started executing on the device, a time when the update finished executing, or another time. The first instance in time may be any length of time, such as a length of time that has elapsed or passed since a trigger event occurred. In one example, a trigger event may be an over-the-air software update, and the length of time in the first instance of time may be one week after the over-the-air software update was installed. In other embodiments, the length of time may be the length of time since the last change to the charging voltage for the battery, the length of time since a software update was installed, the length of time since a certain number of battery charge cycles were completed, or another trigger event. At the first instance in time 110, the charging voltage for the battery 120 may be set to 4.2 volts. The charging voltage may be controlled by a charging circuit at the device, which may limit the charge of the battery 120 to 4.2 volts. The device may include a battery indicator that indicates the battery is fully charged, or 100% charged, when the battery 120 is charged at 4.2 volts.

Over time, the charging voltage of the battery 120 may be modified until a target battery charging voltage is reached. For example, in FIG. 1, a target battery charging voltage may be 4.0 volts. However, rather than immediately changing the battery charging voltage from 4.2 volts to 4.0 volts, the battery charging voltage may be gradually changed in steps or increments over time. As a result, a user of the device may not immediately be impacted by a rapid or sudden change in battery charging capacity (e.g., suddenly reduced battery life, etc.).

At a second instance in time 130, the maximum battery charging voltage of the battery 120 may be adjusted to 4.1 volts. The modified battery 140 may therefore have a maximum battery charging voltage of 4.1 volts. The maximum battery charging voltage may be modified according to battery voltage setting data or a battery charging policy, which may include a look-up table or other structured or unstructured data, that is received from one or more remote servers. The second instance in time may be two weeks after the trigger event (e.g., Week 2). Although the maximum battery voltage was reduced from 4.2 volts in Week 1 to 4.1 volts in Week 2, the battery indicator at the device may continue to present a fully charged or 100% charged indication, as illustrated in FIG. 1. For example, the device may determine that the battery 140 is charged to the voltage value of 4.1 volts, and the device may present an indication that the battery 140 is fully charged.

At a third instance in time 150, the maximum battery charging voltage may be modified at the battery 160 to 4.0 volts. The third instance in time 150 may be, for example, three weeks after a trigger event (e.g., Week 3). Although the battery 160 has a charging voltage that is 0.2 volts less than at Week 1, the battery indicator at the device may still present a fully charged or 100% charged indication when the battery 160 is charged at 4.0 volts. The battery 160 may be prevented from exceeding 4.0 volts.

Although the maximum battery charging voltage in the example of FIG. 1 was reduced from 4.2 volts to 4.0 volts, a user of the device may not be negatively impacted or perceive the change due to the incremental reduction over time. At the same time, potential benefits of reducing the maximum battery charging voltage may still be gained.

The maximum battery charging voltage may be adjusted (e.g., increased or decreased, etc.) over time until a target maximum battery charging voltage is set. For example, in FIG. 1, if the target maximum battery charging voltage was 4.0 volts, the maximum battery charging voltage may remain at 4.0 volts moving forward. If the target maximum battery charging voltage was, for example, 3.8 volts, the maximum battery charging voltage may continue to be reduced by the device according to one or more instructions or data received from one or more remote servers until the target maximum battery charging voltage is reached. The device may reduce the charging voltage locally based on the charging policy and/or one or more instructions or data in the device such as elapsed time, a battery aging factor, accumulated charging cycles, etc. The device may receive the battery charging policy from the remote server. Once the policy is synchronized to the device, the device may select the charging voltage without the need of any other information from the remote server.

An example process flow is illustrated in FIG. 1. At a first operation 170, a device may receive a software update. For example, the device may receive and/or install an operating system update over-the-air. The software update may include a default battery voltage setting data that can be implemented at the device without a remote server. Default settings can be changed at the remote server and pushed to the device or sent upon request. At a second operation 172, the device may receive battery voltage settings data. The battery voltage settings data may include certain maximum battery charging voltages associated with or linked to certain time intervals or lengths of time. For example, 4.1 volts may be associated with 14 days after installation of the over-the-air software update, 4.0 volts may be associated with 21 days after installation of the over-the-air software update, and so forth. In some instances, the battery voltage settings data may be in the form of a look-up table or other structured data. The battery voltage settings data may be received from one or more remote servers and may be a part of the over-the-air software update, or may be provided separately, such as in response to a request from the device. At a third operation 174, the device may determine an elapsed time since the software update. For example, a difference between a current time and a timestamp, such as a time and/or date, associated with the over-the-air software update may be calculated to determine an elapsed time. At a fourth operation 176, the device may determine a maximum battery charging voltage using the elapsed time. For example, if the elapsed time is determined to be 17 days, the maximum battery charging voltage may be determined to be 4.1 volts in the example of FIG. 1. After the elapsed time is determined to be 21 days, the maximum battery charging voltage may be determined to be 4.0 volts.

In some embodiments the device may determine that a charger is connected to the device, and may determine that a charging voltage for the rechargeable battery 120 is 4.2 volts. The device may therefore charge the rechargeable battery at a maximum of 4.2 volts. In some embodiments, the device may periodically, or after occurrence of certain events (e.g., rebooting, powering off, etc.), send a request for a battery charging policy, such as a battery charging voltage look-up table, to a remote server. The device may periodically report a device status to the remote server, where the device status includes a present maximum battery charging voltage for the device. Device reports may be used by the remote server to determine an overall device population status. The battery charging voltage look-up table may include, in one example, a first number of elapsed days from the date the over-the-air update was installed. The first number of elapsed days may be associated with a first charging voltage, such as 4.1 volts. The battery charging voltage look-up table may include a second number of elapsed days from the date the over-the-air update was installed. The second number of days may be associated with a second charging voltage, such as 4.0 volts. The device may receive the battery charging voltage look-up table from the remote server, and may store the battery charging voltage look-up table as persistent data in at least one memory locally at the device. At subsequent charging events, the device may determine that the charger is connected to the device, and the device may calculate a number of days between a present date and the date the over-the-air update was installed. The device may determine that the number of days is equal to or greater than the first number of elapsed days (e.g., 14 days, etc.) and less than the second number of elapsed days (e.g., 21 days, etc.), and may therefore determine that the first charging voltage in the battery charging voltage look-up table is 4.1 volts, and may therefore charge the rechargeable battery at a maximum of 4.1 volts.

As a result, battery capacity and/or maximum battery charging voltages used to charge batteries may be increased or decreased while minimizing impact on a user experience. By managing and/or configuring the maximum battery charging policies, thermal events and/or swelling or other undesired occurrences may be reduced or avoided. Remote management or configuration of battery charging policies may provide functionality that allows for remote configuration of multiple batteries with changes made at one or more computers, such as one or more remote servers.

Example embodiments of the disclosure provide a number of technical features or technical effects. For example, in accordance with example embodiments of the disclosure, certain embodiments of the disclosure may include batteries that with charging voltages configured by one or more remote servers. Some embodiments may include devices configured to determine device usage metrics, battery usage metrics, lengths of elapsed time, and other metrics. The above examples of technical features and/or technical effects of example embodiments of the disclosure are merely illustrative and not exhaustive.

One or more illustrative embodiments of the disclosure have been described above. The above-described embodiments are merely illustrative of the scope of this disclosure and are not intended to be limiting in any way. Accordingly, variations, modifications, and equivalents of the embodiments disclosed herein are also within the scope of this disclosure. The above-described embodiments and additional and/or alternative embodiments of the disclosure will be described in detail hereinafter through reference to the accompanying drawings.

Illustrative Embodiments and Use Cases

Figure 2:
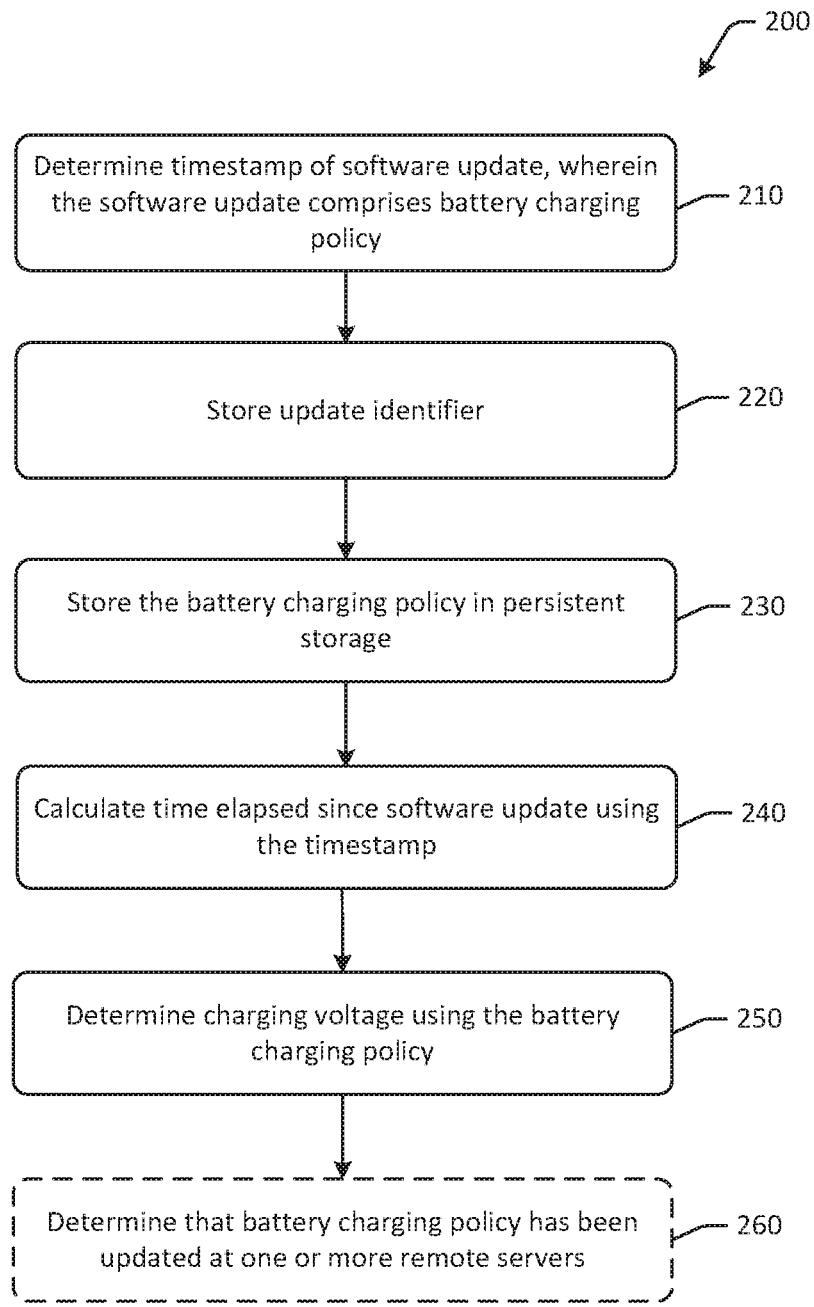
FIG. 2 is an example process flow for remote configuration of battery charging settings in accordance with one or more embodiments of the disclosure.

FIG. 2 is an example process flow 200 for remote configuration of battery charging settings in accordance with one or more embodiments of the disclosure. One or more of the operations of FIG. 2 may be performed at a client device in some embodiments. One or more of the operations of the process flow 200 may be optional and may be performed in any order or at least partially concurrently in some embodiments.

At block 210 of the process flow 200, a timestamp of a software update may be determined, where the software update comprises a battery charging policy. For example, one or more computer processors may execute one or more modules having computer-executable instructions to determine a timestamp, a date, a time, or another chronological metric indicative of a time a software update was received and/or installed at a device. The software update may include a battery charging policy. The battery charging policy may include one or more time values associated with corresponding voltage values. The time values may be time intervals or a number of days, weeks, etc. after the installation of the software update, and the corresponding voltage values may be charging voltage values that are to be used with the corresponding timeframe. For example, a first time value of 30 days may be associated with a voltage value of 3.9 volts. This may indicate that 0-30 days after the installation of the software update, the charging voltage for the battery is to be set to 3.9 volts. A second time value of 60 days may be associated with a voltage value of 3.8 volts, indicating that 31-60 days after the installation of the software update, the charging voltage is to be set to 3.8 volts, and so forth. Multiple time values and/or voltage values may be included in the battery charging policy, so as to configure the battery charging voltage even if the device does not connect to the server(s) during a future time period.

At block 220 of the process flow 200, an update identifier may be stored. For example, one or more computer processors may execute one or more modules having computer-executable instructions to store an identifier for the software update. The identifier may be a software update identifier and/or an identifier for the battery charging policy. The identifier may be used to determine whether the stored battery charging policy is up to date, in one example. For instance, an identifier of up to date or most recent battery charging policy may be received by the device from one or more servers, and may be compared to the locally stored identifier. If the identifiers match, the battery charging policy may be determined to be accurate and/or up to date. If the identifiers do not match, the device may request the up to date battery charging policy. The update identifier may flag or indicate that the battery charging voltage feature has been initialized in persistent memory at the device. The update identifier may indicate that the battery charging voltage feature is supported, a timestamp that the software update was established, validity of the battery charging policy, and/or other information. Accordingly, when the device is first powered on after the software update, the update identifier may initialize the persistent storage, and after subsequent boot up operations, the update identifier will already be set, so the software will not have to initialize the persistent storage. In some embodiments, the update may only be set once and may not be changed, even in the event of a factory reset.

At block 230 of the process flow 200, the battery charging policy may be stored in persistent data storage. For example, one or more computer processors may execute one or more modules having computer-executable instructions to store the battery charging policy in non-volatile memory, such as NVRAM. By storing the battery charging policy in non-volatile memory, the battery charging policy may be available in the event of a system reset and/or reboot, and may persist through a number of device states.

At block 240 of the process flow 200, an elapsed time since the software update may be calculated using the timestamp. For example, one or more computer processors may execute one or more modules having computer-executable instructions to determine or calculate a length of time that has elapsed or passed since the software update was installed. In some embodiments, the length of elapsed time may be a timer, a counter, based at least in part on occurrence of a trigger event, or another point in time. In some embodiments, a timestamp that an over-the-air software update was installed on a device or a memory of the device may be determined and used to calculate a first length of time is an elapsed length of time from the timestamp.

At block 250 of the process flow 200, a charging voltage may be determined using the battery charging policy. For example, one or more computer processors may execute one or more modules having computer-executable instructions to select or determine a charging voltage using the battery charging policy. In some embodiments, a look-up table may be used to select or determine a charging voltage, while in other embodiments other data formats may be used to determine a charging voltage. The charging voltage may be selected or determined based at least in part on an elapsed length of time, usage of a device or battery, charge cycles completed by a battery, an aging factor of the battery, and/or a combination of these or other factors.

At optional block 260 of the process flow 200, it may be determined that the battery charging policy has been updated at one or more remote servers. For example, one or more computer processors may execute one or more modules having computer-executable instructions to determine that the battery charging policy has been updated at a server-side location, and is therefore to be updated locally. In one example, the determination may be made by requesting an update status from the one or more remote servers. In another example, the determination may be made by comparing the update identifier, which may be associated with the software update and/or the battery charging policy, to another identifier that may be received from one or more remote servers. If the identifiers are different, it may be determined that the battery charging policy is to be updated. A request for the updated battery charging policy may be sent to one or more remote servers.

In some embodiments, the battery charging policy may include a first battery charging voltage look-up table. A first identifier associated with the first battery charging voltage look-up table may be stored in at least one memory of the device. The device may send a request for a second battery charging voltage look-up table to one or more remote servers. If there is an updated battery charging voltage look-up table, the updated battery charging voltage look-up table may be stored as system properties data, which may be more persistent than other data storage locations. In some embodiments, the updated battery charging voltage look-up table may overwrite the first battery charging voltage look-up table.

Figure 3:
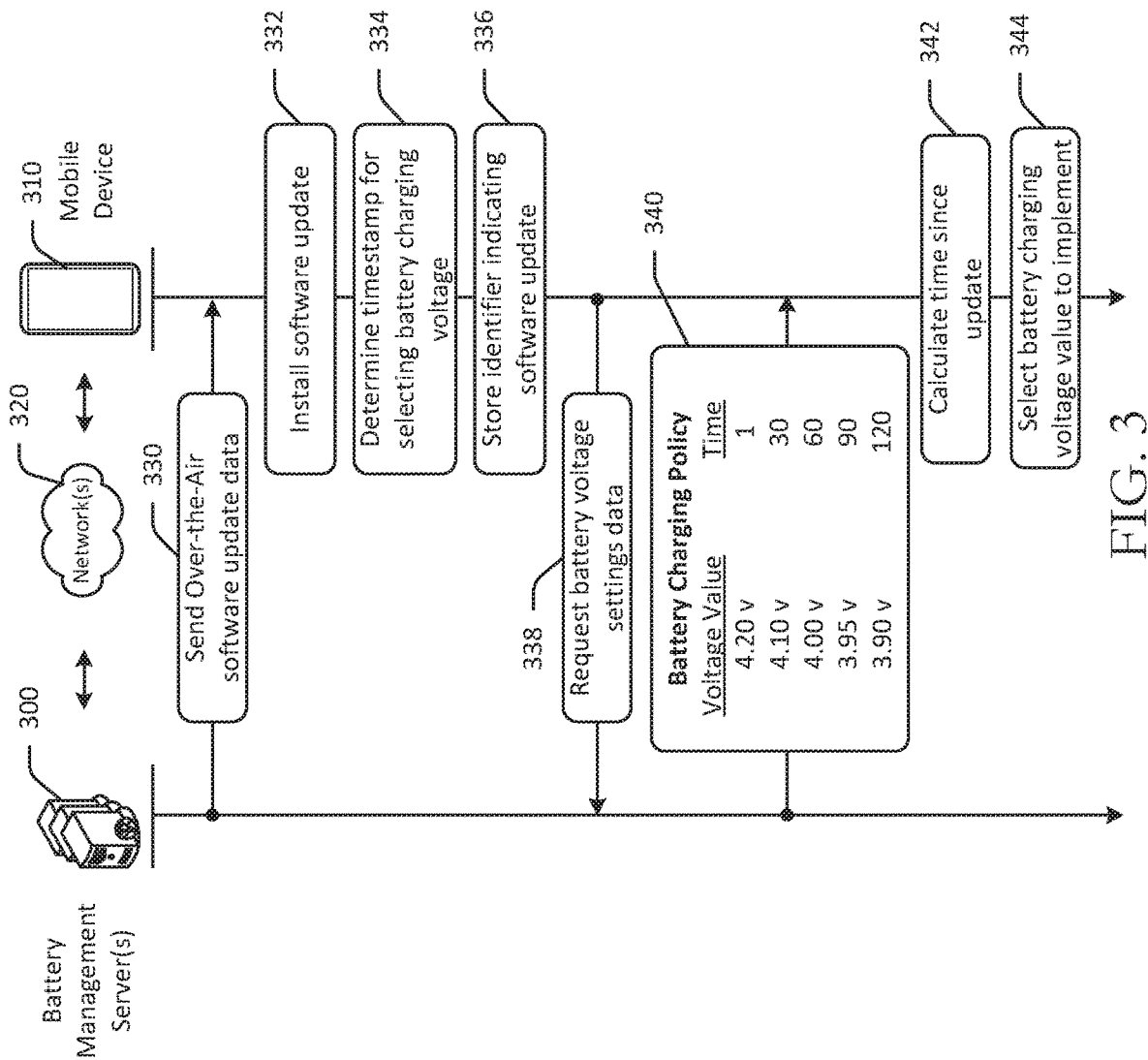
FIG. 3 is a schematic drawing of an example data flow and operations over time in accordance with one or more embodiments of the disclosure.

FIG. 3 is a schematic drawing of an example data flow and operations over time in accordance with one or more embodiments of the disclosure. In the example of FIG. 3, one or more battery management servers 300 are in communication with one or more mobile device(s) 310 via one or more wired or wireless networks 320. Other embodiments may include additional or fewer, or different, components. The battery management server 300 may remotely configure battery charging settings at the mobile device(s) 310. The battery management server 300 may push battery charging policies and/or voltage data to the mobile device(s) 310, or the mobile device(s) 310 may pull battery charging voltage data from the battery management server 300. Changes to a master battery charging voltage data file at the battery management server 300 may be made by an operator, and may be propagated to one or more connected devices 310.

At operation 330, the battery management server(s) 300 may send over-the-air software update data to the mobile device(s) 310. The over-the-air software update data may include one or more changes to an operating system or other software component of the mobile device(s) 310. In some embodiments, an over-the-air software update may not be sent to the mobile device(s) 310.

At operation 332, the mobile device(s) 310 may install the software update that was received over-the-air. At operation 334, the mobile device(s) 310 may determine a timestamp for selecting a battery charge voltage. For example, the timestamp may be a time the software update was installed, a time the battery charging voltage was last modified, or another time. At operation 336, the mobile device(s) 310 may store an identifier indicating the software update. The identifier may be stored in persistent memory.

At operation 338, the mobile device(s) 310 may request battery voltage settings data to the battery management server(s) 300. The battery management server(s) 300 may receive the request. The request may include device and/or battery identification information.

At operation 340, the battery management server(s) 300 may send the battery voltage settings data to the mobile device(s) 310. The battery voltage settings data may include one or more voltage values associated with respective times. For example, a voltage value of 4.2 volts may be associated with 1 day, 1 week, 1 hour, or any other unit of time. In some instances, the time data may be a time to wait from the time the software update was installed. For example, the voltage value of 4.1 volts may be associated with a time of 30, which may be 30 days after the installation of the software. The battery voltage settings data may include voltage values and times for increments of voltage drops or steps that are to occur at various times. The last entry in the battery voltage settings data may be the target charging voltage for the battery.

In one example, the mobile device(s) 310 may determine battery voltage data that is indicative of a maximum voltage value for the battery. The battery voltage data may include a first voltage value associated with a first time interval, such as 4.1 volts is associated with a time interval of 2-30 days, a second voltage value that is associated with a second time interval, such as 4.0 volts is associated with a time interval of 31-60 days, a third voltage value that is associated with a third time interval, such as 3.95 volts is associated with a time interval of 61-90 days, and so forth. Any number of time intervals and/or voltage values may be included, and may be based at least in part on a difference between an initial charging voltage and a target charging voltage (e.g., greater the difference, the greater the number of time intervals and/or voltage values, etc.).

At operation 342, the mobile device(s) 310 may calculate a time since the update, for example by determining a current time and comparing the current time to the timestamp. At operation 344, the mobile device(s) 310 may select a battery charging voltage value to implement. For example, based at least in part on the calculated time and the battery voltage settings data, the battery charging voltage value may be determined for implementation. For example, if the time is 62 days, the voltage value may be set to 4.0 volts, until the calculated time is at least 90 days, etc. The data flow may continue with an iterative loop until the target charging voltage is implemented.

In another example, to determine or select the battery charging voltage value, the mobile device(s) 310 may determine a length of time that the charging voltage for the battery has been set to a certain voltage value. The mobile device(s) 310 may determine a combined length of time of the length of time that includes (i) the charging voltage was set to a preceding voltage value, and (ii) the maximum charging value has been set to the certain voltage value. The combined length of time may be used to determine or select the battery charging voltage value.

In some embodiments, changes to charging voltage may be limited in frequency. For example, changes to charging voltage for a particular battery may be limited to a frequency of once a week. Any attempt to change the charging voltage within the period of, for example, one week, may be blocked or prevented. For example, the mobile device(s) 310 may determine that a charger is connected to the mobile device(s) 310, and may determine a length of time that the charging voltage has been set to a certain voltage value. The mobile device(s) 310 may determine that the charging voltage is to be reduced from the certain voltage value to a reduced voltage value. The mobile device(s) 310 may determine that an elapsed length of time from a preceding reduction is less than a minimum elapsed length of time, and the current charging voltage may be maintained.

Figure 4:
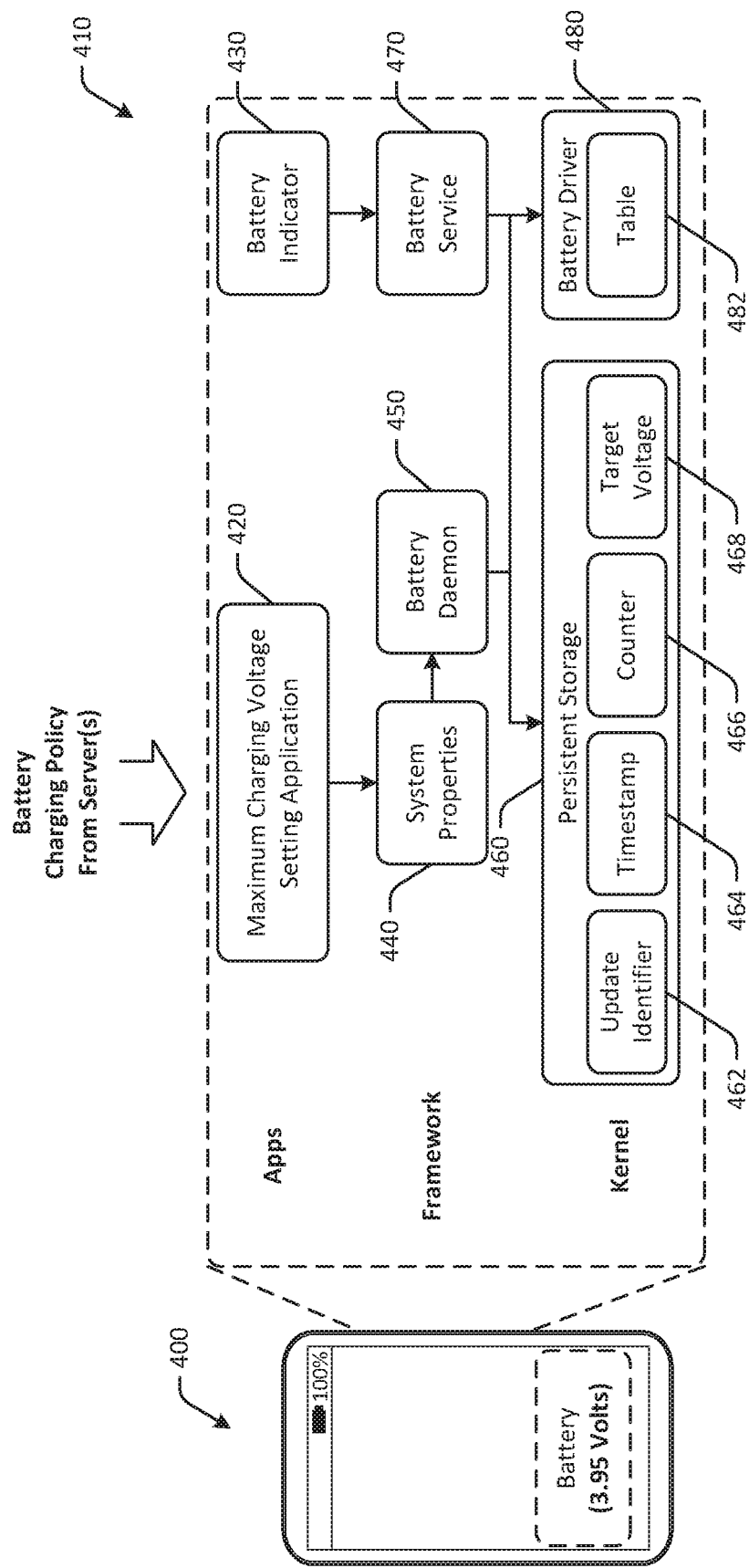
FIG. 4 is a schematic drawing of components of a mobile device with remote configuration of battery charging settings in accordance with one or more embodiments of the disclosure.

FIG. 4 is a schematic drawing of components of a mobile device 400 with remote configuration of battery charging settings in accordance with one or more embodiments of the disclosure. The mobile device 400 may include a battery with a current or present charging voltage set to 3.95 volts.

The mobile device 400 may include one or more software components 410 that may operate at various operating layers of the operating software on the mobile device 400. For example, the software components may be executed at an applications layer, a framework layer, a kernel layer, or another operating layer.

In the example of FIG. 4, the software components 410 of the mobile device 400 may include a charging voltage setting application 420. The charging voltage setting application 420 may be configured to request and/or receive battery voltage settings from one or more remote servers. The charging voltage setting application 420 may be at the application layer and may be in communication with system properties data 440 at the framework layer. The system properties data 440 may receive the battery voltage settings from the charging voltage setting application 420. The system properties data 440 may communicate the battery voltage settings to a battery daemon 450 at the framework layer. The battery daemon 450 may be in communication with persistent data storage 460 and a battery driver 480, both of which may be at the kernel layer.

The persistent data storage 460 may include one or more components that may be partitioned. For example, the persistent data storage 460 may include data associated with an update identifier 462, which may be associated with a software update and/or battery voltage settings data. The persistent data storage 460 may include a timestamp 464, indicative of a time and/or date a software update was installed, a counter 466 that may increment units of time starting at the timestamp, target voltage data 468, which may be indicative of a target charging voltage, and/or other components. In some embodiments, the counter 466 may include battery voltage settings data, such as the battery voltage settings data 340 in FIG. 3. The battery voltage settings received from the remote server may be stored in one or more components of the persistent data storage 460. One or more zcv tables may be stored in the form of a look-up table 482, or another format of data at the battery driver 480. In some embodiments, the table 482 may be stored at the battery daemon 450, and may be sent or passed to the battery driver 480 at runtime. Zcv tables may be used to convert battery voltage to battery capacity for displaying the battery indicators. In an example, when the charging voltage is 4.2V, the battery daemon 450 may pass the zcv table for 4.2 volts to the battery driver 480, and when the battery charging voltage is 4.0 volts, the battery daemon 450 may pass the zcv table for 4.0 volts to the battery driver 480. In some embodiments, the tables can be stored both in the battery daemon 450 and the battery driver 480.

A battery indicator 430, which may present information and/or graphics related to a state of charge of the battery at a display of the mobile device 400, may be an application and may be in communication with a battery service 470 at the framework layer. The battery service 470 may be in communication with the battery driver 480 and, in some instances, the persistent data storage 460. The battery daemon 450 may determine what the charging voltage is for the battery using, for example, the battery driver 480, and may cause a certain battery indication or graphic to be presented. In the example of FIG. 4, the battery indicator 430 may present a fully charged indication when the battery is charged at 3.95 volts.

Using the software components 410, the mobile device 400 may be configured for remote configuration or modification of battery charging settings. For example, the mobile device 400 may determine that a charger is connected to the mobile device 400, and may determine a first length of time that a charging voltage for the battery has been set to a first voltage value. For instance, using the counter 466, the target voltage 468, and/or the battery driver 480, the mobile device 400 may determine that the charging voltage has been set to 3.95 volts for 2.5 weeks. The mobile device 400 may determine, using the target voltage 468 and/or the table 482, that the charging voltage is to be reduced from a first voltage value of 3.95 volts to a second voltage value of 3.90 volts, and the mobile device 400 may charge the battery at a maximum of the second voltage value of 3.90 volts using the charger.

In another example, the mobile device 400 may detect or determine that a charger is connected to the mobile device 400. The mobile device 400 may determine battery voltage data, which may be at the battery driver 480 and/or at the persistent data storage 460, and may include a first time value (e.g., 20 days, 3 weeks, 2 months, etc.) associated with a first charging voltage value (e.g., 3.95 volts, 4.2 volts, etc.), a second time value associated with a second charging voltage value, and so forth. The mobile device 400 may determine a first length of time since a software update was installed at the mobile device 400, such as by using the timestamp data 464, the counter 466, or another component or data. The mobile device 400 may determine, based at least in part on the first length of time, that a charging voltage is to be set to the first charging voltage value, and may charge the battery at the first charging voltage value. The mobile device 400 may determine a second length of time since the software update was installed at another instance in time, such as the following day, and may determine, based at least in part on the second length of time, that the charging voltage is to be set to a second charging voltage value. The mobile device 400 may charge the battery at the second charging voltage value. In some instances, the second charging voltage value may be less than the first charging voltage value, while in other instances, the second charging voltage value may be greater than the first charging voltage value.

Figure 5:
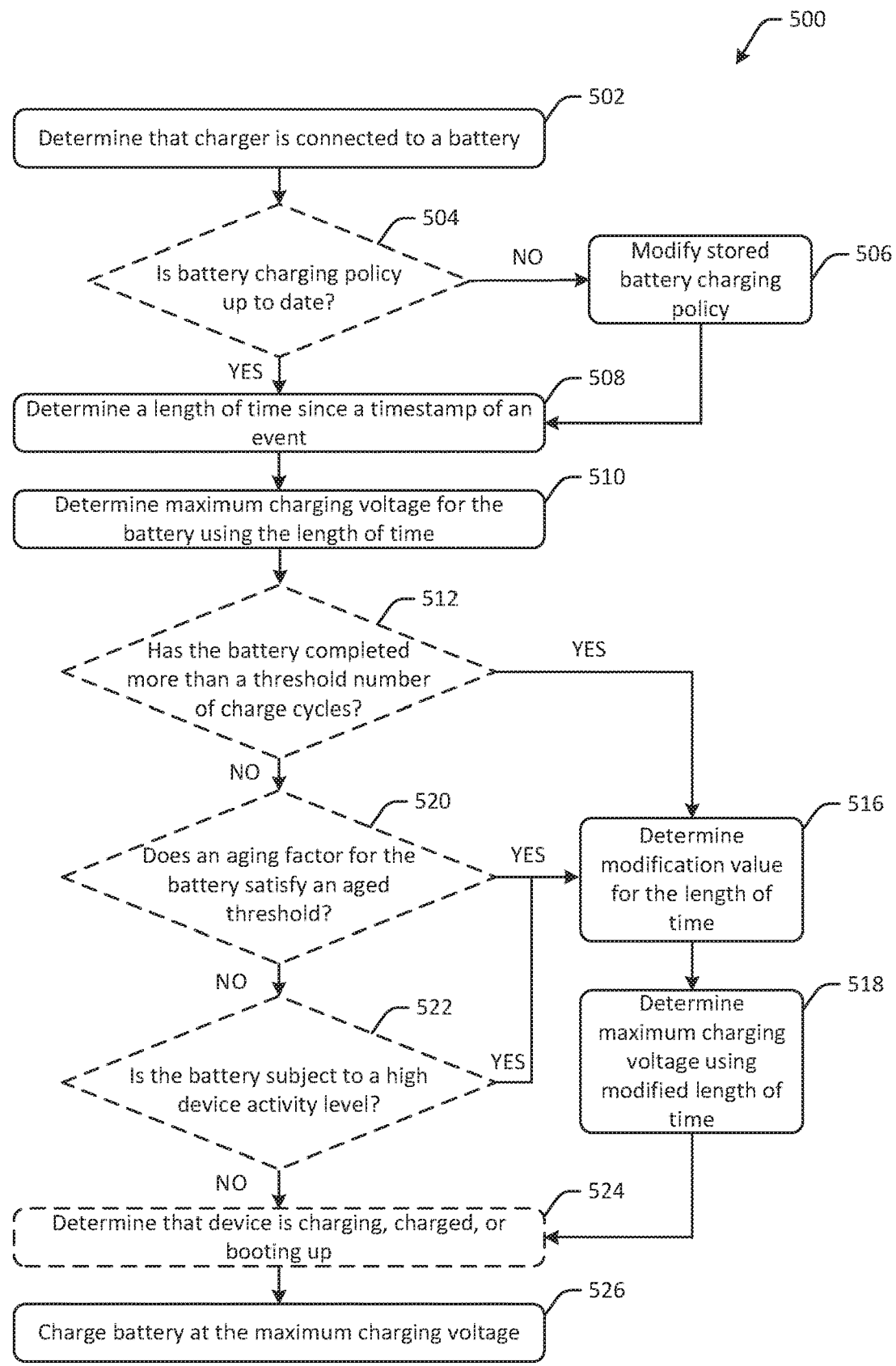
FIG. 5 is an example process flow for remote configuration of battery charging settings in accordance with one or more embodiments of the disclosure.

FIG. 5 is an example process flow 500 for remote configuration of battery charging settings in accordance with one or more embodiments of the disclosure. One or more of the operations of FIG. 5 may be performed at a client device in some embodiments. One or more of the operations of the process flow 500 may be optional and may be performed in any order or at least partially concurrently in some embodiments. The process flow 500 may be performed iteratively in some embodiments.

At block 502, a device or a battery may determine that a charger is connected to the battery. For example, a charging circuit may be used to determine or detect presence of a charger.

At determination block 504, a determination is made as to whether the battery voltage data at the device is up to date. For example, one or more modules at a device or at a server may be executed to determine whether battery voltage data stored at the device is up to date. In one instance, identifiers of battery voltage data may be compared, while in other instances, update times, times associated with battery voltage data, individual battery voltage values, or other metrics may be used to determine whether the battery voltage data is up to date.

If it is determined at determination block 504 that the battery voltage data is not up to date, the process flow 500 may proceed to block 506, at which the stored battery voltage data may be modified. For example, one or more entries in the battery voltage data, or the entire file, may be replaced or overridden with up to date battery voltage data that may be retrieved or received from one or more servers. The process flow 500 may proceed to block 508.

If it is determined at determination block 504 that the battery voltage data is up to date, the process flow 500 may proceed to block 508. At block 508, the mobile device may determine a length of time since a timestamp of an event. For example, the mobile device may determine an elapsed time since a maximum battery voltage was modified, since an update was installed, since the device was rebooted or fully charged, or another event.

At block 510, the mobile device may determine a charging voltage for the battery using the length of time. For example, the mobile device may use the battery voltage data and select or determine a charging voltage for the battery based at least in part on the length of time.

At optional determination block 512, a determination may be made as to whether the battery has completed equal to or more than a threshold number of charge cycles. The threshold number may represent an aged threshold. Charge cycles may be indicative of usage and/or age of a battery. For example, the higher the number of charge cycles, the older the battery may be in some instances. In one embodiment, one or more modules stored at the mobile device may be executed to determine that a number of charge cycles or historical charging cycles for the battery satisfies an aged battery threshold, where the aged battery threshold is indicative of an amount of usage of the battery.

If it is determined at determination block 512 that the battery has completed more than the threshold number of charge cycles, or that the aged battery threshold is satisfied, the process flow 500 may proceed to block 516. At block 516, a modification value or a modified value may be determined for the length of time. For example, if the elapsed length of time is 7 days, and the modification value is "multiply by 2," then the elapsed length of time may be determined to be 14 days. Alternately, time value data at the battery voltage data may be modified instead of the length of time. The modification value may be positive or negative, and may increase or decrease the length of time or the time value data. The modification value may be determined based at least in part on the number of charge cycles (e.g., higher the charge cycles, the higher the modifier value, etc.).

In some embodiments, certain voltage values may be skipped. A voltage value skip threshold may be used to determine whether to skip a voltage value. The voltage value skip threshold may be a number of charge cycles that have been completed by the battery. Charge cycles may be discharge events that equal a total of the battery capacity (e.g., 100% of the battery capacity, etc.) and may occur over a time period. For example, if the number of charge cycles is determined to satisfy a voltage value skip threshold, a voltage value in the battery voltage data may be skipped. If the voltage value skip threshold is 1000 charge cycles, and the battery has completed 1000 or more charge cycles, one or more voltage values may be skipped. Voltage values may be skipped by setting the time interval that corresponds to the voltage value to zero. In another example, a scheduled voltage reduction may be skipped so as to leave the battery at a current voltage level for longer. In some instances, the time interval for the voltage level may be increased or extended.

In another example, the mobile device may determine a battery usage frequency classification for the battery. The battery usage frequency may be based at least in part on a number of charging events over a time period, an amount of use over a time period, or another factor indicative of usage of the battery. The mobile device may determine a charging voltage based at least in part on the first length of time and/or the battery usage frequency classification.

If it is determined at determination block 512 that the battery has not completed more than the threshold number of charge cycles, the process flow 500 may proceed to optional determination block 520. At determination block 520, a determination may be made as to whether an aging factor for the battery satisfies an aged threshold. For example, an aged threshold may indicate that the battery has consumed some or a majority of its useful life. Charging voltage reductions may be configured differently for such batteries.

An aging factor for a battery may be determined by measuring a first difference in battery current capacity during discharge from a first battery voltage to a second battery voltage using a battery level indicator, calculating a second difference in battery current capacity during discharge from the first battery voltage to the second battery voltage using the battery voltage data, and determining an aging factor for the battery using the first difference and the second difference. In some embodiments, modifier values may be determined by using aging factors. If it is determined at determination block 520 that the aging factor satisfies the aged threshold, the process flow 500 may proceed to block 516, at which the modification value may be determined based at least in part on the number of charge cycles and/or the aging factor.

If it is determined at determination block 520 that the aging factor does not satisfy the aged threshold, the process flow 500 may proceed to optional determination block 522. At optional determination block 522, a determination may be made as to whether the battery is subject to a high device activity level. A high activity device level may indicate that the battery is used to power a device for a certain number of hours per day, per week, etc., completes a number of charge cycles in a time period, or another metric. For example, the mobile device may determine a number of hours of usage of the battery over a one week time period (or any time interval), and may determine that the number of hours satisfies a high device or active device usage threshold.

In another example, the mobile device may determine usage data for the mobile device over a period of time, in order to determine a first device activity classification for the battery (e.g., high use, medium use, low use, etc.). Usage data may be determined based at least in part on device usage in embodiments where the battery was used to power the device. The first device activity classification may be based at least in part on usage of the device or the battery over a first time period. For example, if the battery is used 50 or more hours during a one week time period, the device may be classified as a high use device, whereas if the battery is used 5 hours or less during the one week time period, the device may be classified as a low use device, and so forth. In some embodiments, modifier values may decrease time intervals or time values of battery voltage data, while in other embodiments, modifier values may increase time intervals or time values of battery voltage data. For example, active devices may be accelerated to a target maximum battery charging voltage, while inactive devices may be decelerated to a target maximum battery charging voltage. Magnitudes of voltage adjustments may be modified in addition to lengths of time.

If it is determined at determination block 522 that the battery is subject to a high device activity level, the process flow 500 may proceed to block 516. At block 516, the modification value or modifier value may be determined using one or more of the length of time, the number of charge cycles, the aging factor, the device activity classification, and so forth. In one example, a modification value may be an acceleration factor that reduces the length of time or a number of elapsed days either from a trigger event, or a number of elapsed days in a battery charging voltage look-up table (e.g., time values, etc.) by half or by another amount. A modifier value may be a deceleration factor that increases one or more time values or lengths of time, thereby slowing the process of reaching a target maximum battery charging voltage. The acceleration factor may be a function of the battery usage. For example, if the battery has completed greater than a first number of charge cycles, such as 500 charge cycles, the acceleration factor may be 1.5 (resulting in a 25% reduction of the elapsed time in the battery voltage settings data), whereas if the battery has completed a second number of charge cycles, such as 1000 charge cycles, the acceleration factor may be 2 (resulting in a 50% reduction of the elapsed time in the battery voltage settings data).

At block 518, the mobile device 400 may determine the charging voltage using the modified length of time. The process flow 500 may proceed to block 524.

If it is determined at determination block 522 that the battery is not subject to a high device activity level, the process flow 500 may proceed to block 524.

At optional block 524, the mobile device may determine that the device is in one or more states (i) a charging state; (ii) a fully charged state; or (iii) a boot-up state. If so, a user may likely not be impacted by any changes to the charging voltage. If so, the mobile device may replace out of date battery voltage data with the updated battery voltage data. At block 526, the mobile device may charge the battery at the charging voltage.

One or more operations of the methods, process flows, or use cases of FIGS. 1-5 may have been described above as being performed by a user device, or more specifically, by one or more program module(s), applications, or the like executing on a device. It should be appreciated, however, that any of the operations of the methods, process flows, or use cases of FIGS. 1-5 may be performed, at least in part, in a distributed manner by one or more other devices, or more specifically, by one or more program module(s), applications, or the like executing on such devices. In addition, it should be appreciated that processing performed in response to the execution of computer-executable instructions provided as part of an application, program module, or the like may be interchangeably described herein as being performed by the application or the program module itself or by a device on which the application, program module, or the like is executing. While the operations of the methods, process flows, or use cases of FIGS. 1-5 may be described in the context of the illustrative devices, it should be appreciated that such operations may be implemented in connection with numerous other device configurations.

The operations described and depicted in the illustrative methods, process flows, and use cases of FIGS. 1-5 may be carried out or performed in any suitable order, such as the depicted orders, as desired in various example embodiments of the disclosure. Additionally, in certain example embodiments, at least a portion of the operations may be carried out in parallel. Furthermore, in certain example embodiments, less, more, or different operations than those depicted in FIGS. 1-5 may be performed.

Although specific embodiments of the disclosure have been described, one of ordinary skill in the art will recognize that numerous other modifications and alternative embodiments are within the scope of the disclosure. For example, any of the functionality and/or processing capabilities described with respect to a particular device or component may be performed by any other device or component. Further, while various illustrative implementations and architectures have been described in accordance with embodiments of the disclosure, one of ordinary skill in the art will appreciate that numerous other modifications to the illustrative implementations and architectures described herein are also within the scope of this disclosure.

Certain aspects of the disclosure are described above with reference to block and flow diagrams of systems, methods, apparatuses, and/or computer program products according to example embodiments. It will be understood that one or more blocks of the block diagrams and flow diagrams, and combinations of blocks in the block diagrams and the flow diagrams, respectively, may be implemented by the execution of computer-executable program instructions. Likewise, some blocks of the block diagrams and flow diagrams may not necessarily need to be performed in the order presented, or may not necessarily need to be performed at all, according to some embodiments. Further, additional components and/or operations beyond those depicted in blocks of the block and/or flow diagrams may be present in certain embodiments.

Accordingly, blocks of the block diagrams and flow diagrams support combinations of means for performing the specified functions, combinations of elements or steps for performing the specified functions, and program instruction means for performing the specified functions. It will also be understood that each block of the block diagrams and flow diagrams, and combinations of blocks in the block diagrams and flow diagrams, may be implemented by special-purpose, hardware-based computer systems that perform the specified functions, elements or steps, or combinations of special-purpose hardware and computer instructions.

Illustrative Computer Architecture

Figure 6:
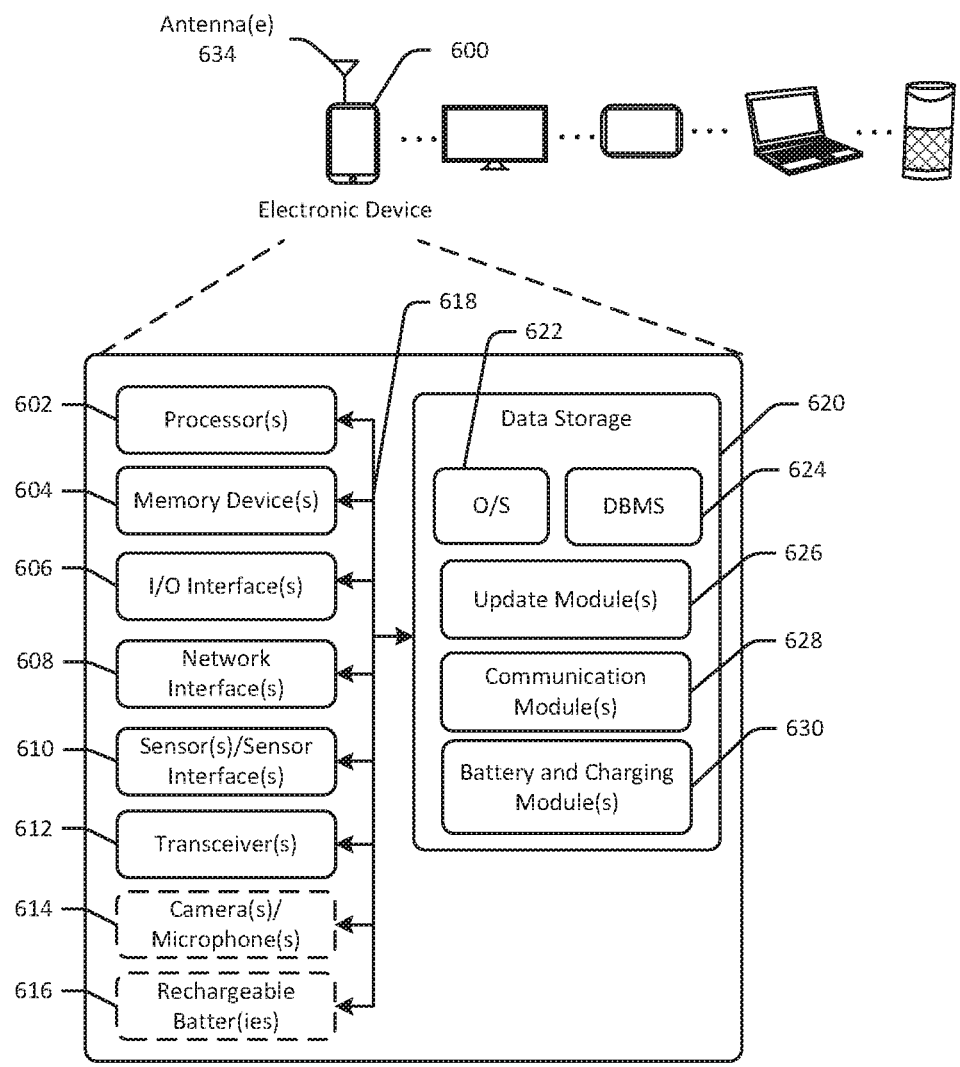
FIG. 6 schematically illustrates an example architecture of an electronic device in accordance with one or more embodiments of the disclosure.

FIG. 6 is a schematic block diagram of one or more illustrative electronic device(s) 600 in accordance with one or more example embodiments of the disclosure. The electronic device(s) 600 may include any suitable computing device including, but not limited to, a server system, a mobile device such as a smartphone, a tablet, an e-reader, a wearable device, or the like; a desktop computer; a laptop computer; a content streaming device; a set-top box; a scanning device; a barcode scanning wand; or the like. The electronic device(s) 600 may correspond to an illustrative device configuration for the mobile device(s) of FIGS. 1-5.

The electronic device(s) 600 may be configured to communicate with one or more servers, user devices, or the like. The electronic device(s) 600 may be configured to determine voice commands, determine wakeword utterances, determine and/or control other devices, and other operations. The electronic device(s) 600 may be configured to present content, detect sound, output digital content, and other functionality. In some embodiments, a single remote server or a single group of remote servers may be configured to perform more than one type of functionality in conjunction with an electronic device.

The electronic device(s) 600 may be configured to communicate via one or more networks. Such network(s) may include, but are not limited to, any one or more different types of communications networks such as, for example, cable networks, public networks (e.g., the Internet), private networks (e.g., frame-relay networks), wireless networks, cellular networks, telephone networks (e.g., a public switched telephone network), or any other suitable private or public packet-switched or circuit-switched networks. Further, such network(s) may have any suitable communication range associated therewith and may include, for example, global networks (e.g., the Internet), metropolitan area networks (MANs), wide area networks (WANs), local area networks (LANs), or personal area networks (PANs). In addition, such network(s) may include communication links and associated networking devices (e.g., link-layer switches, routers, etc.) for transmitting network traffic over any suitable type of medium including, but not limited to, coaxial cable, twisted-pair wire (e.g., twisted-pair copper wire), optical fiber, a hybrid fiber-coaxial (HFC) medium, a microwave medium, a radio frequency communication medium, a satellite communication medium, or any combination thereof.

In an illustrative configuration, the electronic device(s) 600 may include one or more processors (processor(s)) 602, one or more memory devices 604 (also referred to herein as memory 604), one or more input/output (I/O) interface(s) 606, one or more network interface(s) 608, one or more sensor(s) or sensor interface(s) 610, one or more transceiver(s) 612, one or more optional camera(s) and/or microphone(s) 614, one or more optional rechargeable batteries 616, and data storage 620. The electronic device(s) 600 may further include one or more bus(es) 618 that functionally couple various components of the electronic device(s) 600. The electronic device(s) 600 may further include one or more antenna(e) 634 that may include, without limitation, a cellular antenna for transmitting or receiving signals to/from a cellular network infrastructure, an antenna for transmitting or receiving Wi-Fi signals to/from an access point (AP), a Global Navigation Satellite System (GNSS) antenna for receiving GNSS signals from a GNSS satellite, a Bluetooth antenna for transmitting or receiving Bluetooth signals, a Near Field Communication (NFC) antenna for transmitting or receiving NFC signals, and so forth. These various components will be described in more detail hereinafter.

The bus(es) 618 may include at least one of a system bus, a memory bus, an address bus, or a message bus, and may permit the exchange of information (e.g., data (including computer-executable code), signaling, etc.) between various components of the electronic device(s) 600. The bus(es) 618 may include, without limitation, a memory bus or a memory controller, a peripheral bus, an accelerated graphics port, and so forth. The bus(es) 618 may be associated with any suitable bus architecture including, without limitation, an Industry Standard Architecture (ISA), a Micro Channel Architecture (MCA), an Enhanced ISA (EISA), a Video Electronics Standards Association (VESA) architecture, an Accelerated Graphics Port (AGP) architecture, a Peripheral Component Interconnect (PCI) architecture, a PCI-Express architecture, a Personal Computer Memory Card International Association (PCMCIA) architecture, a Universal Serial Bus (USB) architecture, and so forth.

The memory 604 of the electronic device(s) 600 may include volatile memory (memory that maintains its state when supplied with power) such as random access memory (RAM) and/or non-volatile memory (memory that maintains its state even when not supplied with power) such as read-only memory (ROM), flash memory, ferroelectric RAM (FRAM), and so forth. Persistent data storage, as that term is used herein, may include non-volatile memory. In certain example embodiments, volatile memory may enable faster read/write access than non-volatile memory. However, in certain other example embodiments, certain types of non-volatile memory (e.g., FRAM) may enable faster read/write access than certain types of volatile memory.

In various implementations, the memory 604 may include multiple different types of memory such as various types of static random access memory (SRAM), various types of dynamic random access memory (DRAM), various types of unalterable ROM, and/or writeable variants of ROM such as electrically erasable programmable read-only memory (EEPROM), flash memory, and so forth. The memory 604 may include main memory as well as various forms of cache memory such as instruction cache(s), data cache(s), translation lookaside buffer(s) (TLBs), and so forth. Further, cache memory such as a data cache may be a multi-level cache organized as a hierarchy of one or more cache levels (L1, L2, etc.).

The data storage 620 may include removable storage and/or non-removable storage including, but not limited to, magnetic storage, optical disk storage, and/or tape storage. The data storage 620 may provide non-volatile storage of computer-executable instructions and other data. The memory 604 and the data storage 620, removable and/or non-removable, are examples of computer-readable storage media (CRSM) as that term is used herein.

The data storage 620 may store computer-executable code, instructions, or the like that may be loadable into the memory 604 and executable by the processor(s) 602 to cause the processor(s) 602 to perform or initiate various operations. The data storage 620 may additionally store data that may be copied to the memory 604 for use by the processor(s) 602 during the execution of the computer-executable instructions. Moreover, output data generated as a result of execution of the computer-executable instructions by the processor(s) 602 may be stored initially in the memory 604, and may ultimately be copied to the data storage 620 for non-volatile storage.

More specifically, the data storage 620 may store one or more operating systems (O/S) 622; one or more database management systems (DBMS) 624; and one or more program module(s), applications, engines, computer-executable code, scripts, or the like such as, for example, one or more update module(s) 626, one or more communication module(s) 628, and/or one or more battery and charging module(s) 630. Some or all of these module(s) may be sub-module(s). Any of the components depicted as being stored in the data storage 620 may include any combination of software, firmware, and/or hardware. The software and/or firmware may include computer-executable code, instructions, or the like that may be loaded into the memory 604 for execution by one or more of the processor(s) 602. Any of the components depicted as being stored in the data storage 620 may support functionality described in reference to corresponding components named earlier in this disclosure.

The data storage 620 may further store various types of data utilized by the components of the electronic device(s) 600. Any data stored in the data storage 620 may be loaded into the memory 604 for use by the processor(s) 602 in executing computer-executable code. In addition, any data depicted as being stored in the data storage 620 may potentially be stored in one or more datastore(s) and may be accessed via the DBMS 624 and loaded in the memory 604 for use by the processor(s) 602 in executing computer-executable code. The datastore(s) may include, but are not limited to, databases (e.g., relational, object-oriented, etc.), file systems, flat files, distributed datastores in which data is stored on more than one node of a computer network, peer-to-peer network datastores, or the like. In FIG. 6, an example datastore(s) may include, for example, historical data for previously identified products, purchase or order history, user profile information, and/or other information.

The processor(s) 602 may be configured to access the memory 604 and execute the computer-executable instructions loaded therein. For example, the processor(s) 602 may be configured to execute the computer-executable instructions of the various program module(s), applications, engines, or the like of the electronic device(s) 600 to cause or facilitate various operations to be performed in accordance with one or more embodiments of the disclosure. The processor(s) 602 may include any suitable processing unit capable of accepting data as input, processing the input data in accordance with stored computer-executable instructions, and generating output data. The processor(s) 602 may include any type of suitable processing unit including, but not limited to, a central processing unit, a microprocessor, a Reduced Instruction Set Computer (RISC) microprocessor, a Complex Instruction Set Computer (CISC) microprocessor, a microcontroller, an Application Specific Integrated Circuit (ASIC), a Field-Programmable Gate Array (FPGA), a System-on-a-Chip (SoC), a digital signal processor (DSP), and so forth. Further, the processor(s) 602 may have any suitable microarchitecture design that includes any number of constituent components such as, for example, registers, multiplexers, arithmetic logic units, cache controllers for controlling read/write operations to cache memory, branch predictors, or the like. The microarchitecture design of the processor(s) 602 may be capable of supporting any of a variety of instruction sets.

Referring now to functionality supported by the various program module(s) depicted in FIG. 6, the update module(s) 626 may include computer-executable instructions, code, or the like that responsive to execution by one or more of the processor(s) 602 may perform functions including, but not limited to, requesting and/or receiving software updates, such as over-the-air updates, requesting battery voltage data, storing data, and the like.

The communication module(s) 628 may include computer-executable instructions, code, or the like that responsive to execution by one or more of the processor(s) 602 may perform functions including, but not limited to, sending and/or receiving data, including content, sending and/or receiving instructions and commands, and the like.

The battery and charging module(s) 630 may include computer-executable instructions, code, or the like that responsive to execution by one or more of the processor(s) 602 may perform functions including, but not limited to, determining a charging voltage, calculating elapsed time, calculating modifier values, acceleration factors, deceleration factors, adjusting charging voltages, and the like.

Referring now to other illustrative components depicted as being stored in the data storage 620, the O/S 622 may be loaded from the data storage 620 into the memory 604 and may provide an interface between other application software executing on the electronic device(s) 600 and the hardware resources of the electronic device(s) 600. More specifically, the O/S 622 may include a set of computer-executable instructions for managing the hardware resources of the electronic device(s) 600 and for providing common services to other application programs (e.g., managing memory allocation among various application programs). In certain example embodiments, the O/S 622 may control execution of the other program module(s). The O/S 622 may include any operating system now known or which may be developed in the future including, but not limited to, any server operating system, any mainframe operating system, or any other proprietary or non-proprietary operating system.

The DBMS 624 may be loaded into the memory 604 and may support functionality for accessing, retrieving, storing, and/or manipulating data stored in the memory 604 and/or data stored in the data storage 620. The DBMS 624 may use any of a variety of database models (e.g., relational model, object model, etc.) and may support any of a variety of query languages. The DBMS 624 may access data represented in one or more data schemas and stored in any suitable data repository including, but not limited to, databases (e.g., relational, object-oriented, etc.), file systems, flat files, distributed datastores in which data is stored on more than one node of a computer network, peer-to-peer network datastores, or the like. In those example embodiments in which the electronic device(s) 600 is a mobile device, the DBMS 624 may be any suitable lightweight DBMS optimized for performance on a mobile device.

Referring now to other illustrative components of the electronic device(s) 600, the input/output (I/O) interface(s) 606 may facilitate the receipt of input information by the electronic device(s) 600 from one or more I/O devices as well as the output of information from the electronic device(s) 600 to the one or more I/O devices. The I/O devices may include any of a variety of components such as a display or display screen having a touch surface or touchscreen; an audio output device for producing sound, such as a speaker; an audio capture device, such as a microphone; an image and/or video capture device, such as a camera; a haptic unit; and so forth. Any of these components may be integrated into the electronic device(s) 600 or may be separate. The I/O devices may further include, for example, any number of peripheral devices such as data storage devices, printing devices, and so forth.

The I/O interface(s) 606 may also include an interface for an external peripheral device connection such as universal serial bus (USB), FireWire, Thunderbolt, Ethernet port or other connection protocol that may connect to one or more networks. The I/O interface(s) 606 may also include a connection to one or more of the antenna(e) 634 to connect to one or more networks via a wireless local area network (WLAN) (such as Wi-Fi) radio, Bluetooth, ZigBee, and/or a wireless network radio, such as a radio capable of communication with a wireless communication network such as a Long Term Evolution (LTE) network, WiMAX network, 3G network, a ZigBee network, etc.

The electronic device(s) 600 may further include one or more network interface(s) 608 via which the electronic device(s) 600 may communicate with any of a variety of other systems, platforms, networks, devices, and so forth. The network interface(s) 608 may enable communication, for example, with one or more wireless routers, one or more host servers, one or more web servers, and the like via one or more networks.

The antenna(e) 634 may include any suitable type of antenna depending, for example, on the communications protocols used to transmit or receive signals via the antenna(e) 634. Non-limiting examples of suitable antennae may include directional antennae, non-directional antennae, dipole antennae, folded dipole antennae, patch antennae, multiple-input multiple-output (MIMO) antennae, or the like. The antenna(e) 634 may be communicatively coupled to one or more transceivers 612 or radio components to which or from which signals may be transmitted or received.

As previously described, the antenna(e) 634 may include a cellular antenna configured to transmit or receive signals in accordance with established standards and protocols, such as Global System for Mobile Communications (GSM), 3G standards (e.g., Universal Mobile Telecommunications System (UMTS), Wideband Code Division Multiple Access (W-CDMA), CDMA2000, etc.), 4G standards (e.g., Long-Term Evolution (LTE), WiMax, etc.), direct satellite communications, or the like.

The antenna(e) 634 may additionally, or alternatively, include a Wi-Fi antenna configured to transmit or receive signals in accordance with established standards and protocols, such as the IEEE 802.11 family of standards, including via 2.4 GHz channels (e.g., 802.11b, 802.11g, 802.11n), 5 GHz channels (e.g., 802.11n, 802.11ac), or 60 GHz channels (e.g., 802.11ad). In alternative example embodiments, the antenna(e) 634 may be configured to transmit or receive radio frequency signals within any suitable frequency range forming part of the unlicensed portion of the radio spectrum.

The antenna(e) 634 may additionally, or alternatively, include a GNSS antenna configured to receive GNSS signals from three or more GNSS satellites carrying time-position information to triangulate a position therefrom. Such a GNSS antenna may be configured to receive GNSS signals from any current or planned GNSS such as, for example, the Global Positioning System (GPS), the GLONASS System, the Compass Navigation System, the Galileo System, or the Indian Regional Navigational System.

The transceiver(s) 612 may include any suitable radio component(s) for—in cooperation with the antenna(e) 634—transmitting or receiving radio frequency (RF) signals in the bandwidth and/or channels corresponding to the communications protocols utilized by the electronic device(s) 600 to communicate with other devices. The transceiver(s) 612 may include hardware, software, and/or firmware for modulating, transmitting, or receiving—potentially in cooperation with any of antenna(e) 634—communications signals according to any of the communications protocols discussed above including, but not limited to, one or more Wi-Fi and/or Wi-Fi direct protocols, as standardized by the IEEE 802.11 standards, one or more non-Wi-Fi protocols, or one or more cellular communications protocols or standards. The transceiver(s) 612 may further include hardware, firmware, or software for receiving GNSS signals. The transceiver(s) 612 may include any known receiver and baseband suitable for communicating via the communications protocols utilized by the electronic device(s) 600. The transceiver(s) 612 may further include a low noise amplifier (LNA), additional signal amplifiers, an analog-to-digital (A/D) converter, one or more buffers, a digital baseband, or the like.

The sensor(s)/sensor interface(s) 610 may include or may be capable of interfacing with any suitable type of sensing device such as, for example, inertial sensors, force sensors, thermal sensors, photocells, and so forth. Example types of inertial sensors may include accelerometers (e.g., MEMS-based accelerometers), gyroscopes, and so forth.

The camera(s) 614 may be any device configured to capture ambient light or images. The microphone(s) 614 may be any device configured to receive analog sound input or voice data. The rechargeable batter(ies) 616 may be any suitable power storage device, such as a lithium ion battery and may be in various form factors, such as pouch form factors, cylindrical form factors, and the like.

It should be appreciated that the program module(s), applications, computer-executable instructions, code, or the like depicted in FIG. 6 as being stored in the data storage 620 are merely illustrative and not exhaustive and that processing described as being supported by any particular module may alternatively be distributed across multiple module(s) or performed by a different module. In addition, various program module(s), script(s), plug-in(s), Application Programming Interface(s) (API(s)), or any other suitable computer-executable code hosted locally on the electronic device(s) 600, and/or hosted on other computing device(s) accessible via one or more networks, may be provided to support functionality provided by the program module(s), applications, or computer-executable code depicted in FIG. 6 and/or additional or alternate functionality. Further, functionality may be modularized differently such that processing described as being supported collectively by the collection of program module(s) depicted in FIG. 6 may be performed by a fewer or greater number of module(s), or functionality described as being supported by any particular module may be supported, at least in part, by another module. In addition, program module(s) that support the functionality described herein may form part of one or more applications executable across any number of systems or devices in accordance with any suitable computing model such as, for example, a client-server model, a peer-to-peer model, and so forth. In addition, any of the functionality described as being supported by any of the program module(s) depicted in FIG. 6 may be implemented, at least partially, in hardware and/or firmware across any number of devices.

It should further be appreciated that the electronic device(s) 600 may include alternate and/or additional hardware, software, or firmware components beyond those described or depicted without departing from the scope of the disclosure. More particularly, it should be appreciated that software, firmware, or hardware components depicted as forming part of the electronic device(s) 600 are merely illustrative and that some components may not be present or additional components may be provided in various embodiments. While various illustrative program module(s) have been depicted and described as software module(s) stored in the data storage 620, it should be appreciated that functionality described as being supported by the program module(s) may be enabled by any combination of hardware, software, and/or firmware. It should further be appreciated that each of the above-mentioned module(s) may, in various embodiments, represent a logical partitioning of supported functionality. This logical partitioning is depicted for ease of explanation of the functionality and may not be representative of the structure of software, hardware, and/or firmware for implementing the functionality. Accordingly, it should be appreciated that functionality described as being provided by a particular module may, in various embodiments, be provided at least in part by one or more other module(s). Further, one or more depicted module(s) may not be present in certain embodiments, while in other embodiments, additional module(s) not depicted may be present and may support at least a portion of the described functionality and/or additional functionality. Moreover, while certain module(s) may be depicted and described as sub-module(s) of another module, in certain embodiments, such module(s) may be provided as independent module(s) or as sub-module(s) of other module(s).

One or more operations of the methods, process flows, and use cases of FIGS. 1-5 may be performed by a device having the illustrative configuration depicted in FIG. 6, or more specifically, by one or more engines, program module(s), applications, or the like executable on such a device. It should be appreciated, however, that such operations may be implemented in connection with numerous other device configurations.

The operations described and depicted in the illustrative methods and process flows of FIGS. 1-5 may be carried out or performed in any suitable order as desired in various example embodiments of the disclosure. Additionally, in certain example embodiments, at least a portion of the operations may be carried out in parallel. Furthermore, in certain example embodiments, less, more, or different operations than those depicted in FIGS. 1-5 may be performed.

Although specific embodiments of the disclosure have been described, one of ordinary skill in the art will recognize that numerous other modifications and alternative embodiments are within the scope of the disclosure. For example, any of the functionality and/or processing capabilities described with respect to a particular device or component may be performed by any other device or component. Further, while various illustrative implementations and architectures have been described in accordance with embodiments of the disclosure, one of ordinary skill in the art will appreciate that numerous other modifications to the illustrative implementations and architectures described herein are also within the scope of this disclosure.

Certain aspects of the disclosure are described above with reference to block and flow diagrams of systems, methods, apparatuses, and/or computer program products according to example embodiments. It will be understood that one or more blocks of the block diagrams and flow diagrams, and combinations of blocks in the block diagrams and the flow diagrams, respectively, may be implemented by execution of computer-executable program instructions. Likewise, some blocks of the block diagrams and flow diagrams may not necessarily need to be performed in the order presented, or may not necessarily need to be performed at all, according to some embodiments. Further, additional components and/or operations beyond those depicted in blocks of the block and/or flow diagrams may be present in certain embodiments.

Accordingly, blocks of the block diagrams and flow diagrams support combinations of means for performing the specified functions, combinations of elements or steps for performing the specified functions, and program instruction means for performing the specified functions. It will also be understood that each block of the block diagrams and flow diagrams, and combinations of blocks in the block diagrams and flow diagrams, may be implemented by special-purpose, hardware-based computer systems that perform the specified functions, elements or steps, or combinations of special-purpose hardware and computer instructions.

Program module(s), applications, or the like disclosed herein may include one or more software components including, for example, software objects, methods, data structures, or the like. Each such software component may include computer-executable instructions that, responsive to execution, cause at least a portion of the functionality described herein (e.g., one or more operations of the illustrative methods described herein) to be performed.

A software component may be coded in any of a variety of programming languages. An illustrative programming language may be a lower-level programming language such as an assembly language associated with a particular hardware architecture and/or operating system platform. A software component comprising assembly language instructions may require conversion into executable machine code by an assembler prior to execution by the hardware architecture and/or platform.

Another example programming language may be a higher-level programming language that may be portable across multiple architectures. A software component comprising higher-level programming language instructions may require conversion to an intermediate representation by an interpreter or a compiler prior to execution.

Other examples of programming languages include, but are not limited to, a macro language, a shell or command language, a job control language, a script language, a database query or search language, or a report writing language. In one or more example embodiments, a software component comprising instructions in one of the foregoing examples of programming languages may be executed directly by an operating system or other software component without having to be first transformed into another form.

A software component may be stored as a file or other data storage construct. Software components of a similar type or functionally related may be stored together such as, for example, in a particular directory, folder, or library. Software components may be static (e.g., pre-established or fixed) or dynamic (e.g., created or modified at the time of execution).

Software components may invoke or be invoked by other software components through any of a wide variety of mechanisms. Invoked or invoking software components may comprise other custom-developed application software, operating system functionality (e.g., device drivers, data storage (e.g., file management) routines, other common routines and services, etc.), or third-party software components (e.g., middleware, encryption, or other security software, database management software, file transfer or other network communication software, mathematical or statistical software, image processing software, and format translation software).

Software components associated with a particular solution or system may reside and be executed on a single platform or may be distributed across multiple platforms. The multiple platforms may be associated with more than one hardware vendor, underlying chip technology, or operating system. Furthermore, software components associated with a particular solution or system may be initially written in one or more programming languages, but may invoke software components written in another programming language.

Computer-executable program instructions may be loaded onto a special-purpose computer or other particular machine, a processor, or other programmable data processing apparatus to produce a particular machine, such that execution of the instructions on the computer, processor, or other programmable data processing apparatus causes one or more functions or operations specified in the flow diagrams to be performed. These computer program instructions may also be stored in a computer-readable storage medium (CRSM) that upon execution may direct a computer or other programmable data processing apparatus to function in a particular manner, such that the instructions stored in the computer-readable storage medium produce an article of manufacture including instruction means that implement one or more functions or operations specified in the flow diagrams. The computer program instructions may also be loaded onto a computer or other programmable data processing apparatus to cause a series of operational elements or steps to be performed on the computer or other programmable apparatus to produce a computer-implemented process.

Additional types of CRSM that may be present in any of the devices described herein may include, but are not limited to, programmable random access memory (PRAM), SRAM, DRAM, RAM, ROM, electrically erasable programmable read-only memory (EEPROM), flash memory or other memory technology, compact disc read-only memory (CD-ROM), digital versatile disc (DVD) or other optical storage, magnetic cassettes, magnetic tape, magnetic disk storage or other magnetic storage devices, or any other medium which can be used to store the information and which can be accessed. Combinations of any of the above are also included within the scope of CRSM. Alternatively, computer-readable communication media (CRCM) may include computer-readable instructions, program module(s), or other data transmitted within a data signal, such as a carrier wave, or other transmission. However, as used herein, CRSM does not include CRCM.

Although embodiments have been described in language specific to structural features and/or methodological acts, it is to be understood that the disclosure is not necessarily limited to the specific features or acts described. Rather, the specific features and acts are disclosed as illustrative forms of implementing the embodiments. Conditional language, such as, among others, "can," "could," "might," or "may," unless specifically stated otherwise, or otherwise understood within the context as used, is generally intended to convey that certain embodiments could include, while other embodiments do not include, certain features, elements, and/or steps. Thus, such conditional language is not generally intended to imply that features, elements, and/or steps are in any way required for one or more embodiments or that one or more embodiments necessarily include logic for deciding, with or without user input or prompting, whether these features, elements, and/or steps are included or are to be performed in any particular embodiment.

That which is claimed is:

1. A device comprising:
    a battery;
    at least one memory that stores computer-executable instructions; and
    at least one processor configured to access the at least one memory and execute the computer-executable instructions to:
        determine a timestamp associated with a software update at the device, the timestamp comprising a time and a date;
        determine a first length of time that has elapsed since the time or date of the timestamp, wherein a maximum charging voltage for the battery is set to a first voltage value during the first length of time;
        determine, based on the first length of time, a second voltage value at which to set the maximum charging voltage, the second voltage value being smaller than the first voltage value; and
        cause the battery to be charged, wherein the second voltage value is the maximum charging voltage for the battery.

2. The device of claim 1, wherein the software update is an over-the-air software update.

3. The device of claim 1, wherein the at least one processor is further configured to access the at least one memory and execute the computer-executable instructions to:
    determine battery voltage data indicative of a maximum charging voltage value for the battery, wherein the battery voltage data comprises a first entry with the first voltage value associated with a first time interval that is less than the first length of time, a second entry with the second voltage value associated with a second time interval that is equal to or greater than the first length of time, and third entry with a third voltage value associated with a third time interval that is greater than the first length of time.

4. The device of claim 3, wherein the at least one processor is further configured to access the at least one memory and execute the computer-executable instructions to:
    determine a second length of time that the maximum charging voltage for the battery has been set to the second voltage value;
    determine that a sum of the first length of time and the second length of time is a total number of days that corresponds to the third time interval; and
    cause the battery to be charged, wherein the third voltage value is the maximum charging voltage for the battery.

5. The device of claim 3, wherein the at least one processor is further configured to access the at least one memory and execute the computer-executable instructions to:
    determine a number of charge cycles the battery has completed;
    determine a modifier value for the second time interval using the number of charge cycles; and
    modify respective entries in the battery voltage data using the modifier value during a subsequent charging operation.

6. The device of claim 5, wherein the at least one processor is further configured to access the at least one memory and execute the computer-executable instructions to:
    determine that the number of charge cycles satisfies a voltage value skip threshold; and
    determine that the second voltage value is to be skipped;
    wherein the at least one processor is configured to modify respective entries in the battery voltage data using the modifier value during a subsequent charging operation by modifying the second entry to have a second time interval that is equal to the first length of time.

7. The device of claim 3, wherein the at least one processor is further configured to access the at least one memory and execute the computer-executable instructions to:
determine a first device activity classification for the battery, wherein the first device activity classification is based at least in part on usage of the device over a first time period;
determine a first modifier value for the second time interval using the first device activity classification; and
modify the second entry to reduce the second time interval using the first modifier value.

8. The device of claim 7, wherein the at least one processor is further configured to access the at least one memory and execute the computer-executable instructions to:
determine a second device activity classification for the battery, wherein the second device activity classification is based at least in part on usage of the device over a second time period;
determine a second modifier value for the second time interval using the second device activity classification; and
modify the second entry to increase the second time interval using the second modifier value.

9. The device of claim 3, wherein the at least one processor is further configured to access the at least one memory and execute the computer-executable instructions to:
measure a first difference in battery current capacity during discharge from a first battery voltage to a second battery voltage;
calculate a second difference in battery current capacity during discharge from the first battery voltage to the second battery voltage using the battery voltage data;
determine an aging factor for the battery using the first difference and the second difference; and
determine a modifier value for the second time interval using the aging factor.

10. The device of claim 1, wherein the at least one processor is further configured to access the at least one memory and execute the computer-executable instructions to:
receive first battery voltage data from a remote server;
determine that the first battery voltage data is different than locally stored second battery voltage data;
determine that the battery is in one of (i) a charging state; (ii) a fully charged state; or (iii) a boot-up state; and
replace the second battery voltage data with the first battery voltage data.

11. The device of claim 1, wherein the at least one processor is further configured to access the at least one memory and execute the computer-executable instructions to:
determine that the charger is connected to the device;
determine a second length of time that the maximum charging voltage has been set to the second voltage value;
determine that the maximum charging voltage is to be reduced from the second voltage value to a third voltage value;
determine that an elapsed length of time from a reduction to the second voltage value is less than a minimum elapsed length of time; and
maintain the maximum charging voltage at the second voltage value.

12. The device of claim 1, wherein the at least one processor is further configured to access the at least one memory and execute the computer-executable instructions to:
determine that the battery is charged to capacity at the second voltage value; and
present an indication that the battery is fully charged.

13. A device comprising:
a battery;
at least one memory that stores computer-executable instructions; and
at least one processor configured to access the at least one memory and execute the computer-executable instructions to:
determine a battery charging policy comprising a first time value associated with a first maximum charging voltage value, and a second time value associated with a second maximum charging voltage value;
determine a first length of time since a software update was installed at the device;
determine a number of charge cycles the battery has completed;
determine, based at least in part on the first length of time and the number of charge cycles, that a maximum charging voltage is to be set to the first maximum charging voltage value; and
charge the battery at the first maximum charging voltage value.

14. The device of claim 13, wherein the at least one processor is further configured to access the at least one memory and execute the computer-executable instructions to:
determine a second length of time since the software update was installed;
determine, based at least in part on the second length of time, that the maximum charging voltage is to be set to the second maximum charging voltage value; and
charge the battery at the second maximum charging voltage value, wherein the second maximum charging voltage value is less than the first maximum charging voltage value.

15. The device of claim 13, wherein the at least one processor is further configured to access the at least one memory and execute the computer-executable instructions to:
determine a battery usage frequency classification for the battery;
wherein the at least one processor is configured to determine that the maximum charging voltage is to be set to the first maximum charging voltage value based at least in part on the first length of time and the battery usage frequency classification.

16. A device comprising:
a battery;
at least one memory that stores computer-executable instructions; and
at least one processor configured to access the at least one memory and execute the computer-executable instructions to:
determine a first length of time that a maximum charging voltage for the battery has been set to a first voltage value;

determine, based on the first length of time, a second voltage value at which to set the maximum charging voltage, the second voltage value being smaller than the first voltage value;

cause the battery to be charged, wherein the second voltage value is the maximum charging voltage for the battery;

determine a second length of time that the maximum charging voltage for the battery has been set to the second voltage value;

determine that a sum of the first length of time and the second length of time is a total number of days that corresponds to a first time interval in battery voltage data; and cause the battery to be charged, wherein a third voltage value is the maximum charging voltage for the battery.

17. The device of claim 16, wherein the at least one processor is further configured to access the at least one memory and execute the computer-executable instructions to:

determine the battery voltage data indicative of a maximum charging voltage value for the battery, wherein the battery voltage data comprises a first entry with the first voltage value associated with a second time interval that is less than the first length of time, a second entry with the second voltage value associated with a third time interval that is equal to or greater than the first length of time, and third entry with a third voltage value associated with a first time interval that is greater than the first length of time.

18. The device of claim 16, wherein the at least one processor is further configured to access the at least one memory and execute the computer-executable instructions to:

determine a number of charge cycles the battery has completed;

determine a modifier value for the second time interval using the number of charge cycles; and modify respective entries in the battery voltage data using the modifier value during a subsequent charging operation.

19. The device of claim 18, wherein the at least one processor is further configured to access the at least one memory and execute the computer-executable instructions to:

determine that the number of charge cycles satisfies a voltage value skip threshold; and determine that the second voltage value is to be skipped;

wherein the at least one processor is configured to modify respective entries in the battery voltage data using the modifier value during a subsequent charging operation by modifying the second entry to have a second time interval that is equal to the first length of time.

* * * * *